United States Patent [19]

Berry et al.

[11] Patent Number: 5,904,976
[45] Date of Patent: *May 18, 1999

[54] POLYMERIC FILM

[75] Inventors: Michael Richard Berry, Guisborough; Paul David Lawrence, Middlesbrough; Gary Victor Rhoades, Stockton-on-Tees, all of United Kingdom

[73] Assignee: Imperial Chemical Industries PLC, London, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/633,829

[22] PCT Filed: Nov. 1, 1994

[86] PCT No.: PCT/GB94/02391

§ 371 Date: Apr. 30, 1996

§ 102(e) Date: Apr. 30, 1996

[87] PCT Pub. No.: WO95/12489

PCT Pub. Date: May 11, 1995

[30] Foreign Application Priority Data

Nov. 4, 1993 [GB] United Kingdom ............... 9322704

[51] Int. Cl.⁶ .................. B32B 27/08; B32B 27/20; B32B 27/30; B32B 27/36
[52] U.S. Cl. .................. 428/212; 428/219; 428/328; 428/341; 428/355 AC; 428/480; 428/522; 428/910; 428/483; 428/914
[58] Field of Search ................ 428/323, 328, 428/330, 331, 343, 354, 355 R, 355 AC, 480, 483, 914, 910; 156/244.11, 244.24, 327; 427/407.1, 393.5; 264/172.19, 173.11, 173.12, 173.16; 526/319

[56] References Cited

U.S. PATENT DOCUMENTS

| | | | |
|---|---|---|---|
| 3,100,722 | 8/1963 | Herrmann et al. | 117/138.8 |
| 3,154,461 | 10/1964 | Johnson | 161/116 |
| 3,382,206 | 5/1968 | Karickhoff | 260/40 |
| 3,515,626 | 6/1970 | Duffield | 161/162 |
| 3,871,947 | 3/1975 | Brekken | 161/116 |
| 4,098,952 | 7/1978 | Kelly et al. | 428/483 |
| 4,571,363 | 2/1986 | Culbertson et al. | 428/332 |
| 5,000,172 | 3/1991 | Ward | 128/155 |
| 5,057,366 | 10/1991 | Husman et al. | 428/355 |
| 5,089,332 | 2/1992 | Feinberg | 428/328 |
| 5,192,611 | 3/1993 | Tomiyama et al. | 428/354 |

FOREIGN PATENT DOCUMENTS

| | | |
|---|---|---|
| 0 044 544 | 1/1982 | European Pat. Off. . |
| 0 458 481 | 11/1991 | European Pat. Off. . |
| 2 402 120 | 8/1974 | Germany . |
| 1 465 973 | 3/1977 | United Kingdom . |
| WO 92/22434 | 12/1992 | WIPO . |

OTHER PUBLICATIONS

Derwent Publications Ltd., London, GB; AN 86–096600 and JP A 61 040 197 Kimoto KK. Feb. 26, 1986.
Derwent Publications Ltd., London, GB; AN 82–08495J and JP A 57 181 861 Mitsubishi Petrochemical KK. Nov. 27, 1991.

*Primary Examiner*—Vivian Chen

[57] ABSTRACT

A polymeric film having a translucent first layer of polymeric material, a transparent second layer of polymeric material on at least one surface of the first layer, and an adherent layer comprising an acrylic resin on the surface of the second layer remote from the first layer is disclosed. Both the first and second layers are preferably formed of biaxially oriented polyethylene terephthalate. The first layer contains an inorganic filler opacifying agent. The polymeric film is particularly suitable for use as an upper sheet in a re-usable label employing the "magic slate" principle.

3 Claims, 1 Drawing Sheet

POLYMERIC FILM

This application is a 371 of PCT/GB94/02391, filed Nov. 1, 1994.

This invention relates to a polymeric film, and in particular to a composite polymeric film.

It is known that polymeric films can be rendered opaque or translucent by the incorporation therein of opacifying agents, particularly inorganic white fillers or pigments such as titanium dioxide and/or inorganic voiding fillers such as barium sulphate and/or organic voiding fillers such as incompatible resins.

Polymeric films generally possess poor adhesion to inks and lacquers. Polymeric films exhibiting good adhesion to a range of inks and lacquers are required in many applications, such as graphic arts, packaging and membrane touch switches. In particular, a translucent polymeric film having good adhesion to printing inks is required for use as an upper sheet material in re-usable labels, for example, for video cassettes and floppy discs. The re-usable label operates by means of the so-called "magic-slate" principle, whereby visible writing is produced by using a suitable pointed instrument to apply pressure to an upper translucent sheet of a re-usable label in order that the sheet comes into contact with a wax layer on a lower sheet of the re-usable label. The writing is erased by lifting the upper sheet away from the lower sheet. Unfortunately upper sheets of commercially available re-usable labels tend to suffer from unwanted permanent marking on repeated use. There is a requirement to improve the quality of the writing, in particular the sharpness of the lines, produced on a re-usable label. The quality of the writing is dependant, inter alia, on the adhesion between the wax layer on the lower sheet and the bottom surface of the upper sheet.

We have now devised a polymeric film which reduces or substantially overcomes one or more of the aforementioned problems.

Accordingly, the present invention provides a polymeric film comprising a translucent first layer of polymeric material, the first layer having on at least one surface thereof a transparent second layer of polymeric material, the second layer having on a surface thereof remote from the first layer, an adherent layer comprising an acrylic resin.

The invention also provides a method of producing a polymeric film which comprises forming a translucent first layer of polymeric material, forming a transparent second layer of polymeric material on at least one surface of the first layer, and applying an adherent layer comprising an acrylic resin to a surface of the second layer remote from the first layer.

The invention further provides the use of a polymeric film comprising a translucent first layer of polymeric material, the first layer having on at least one surface thereof a transparent second layer of polymeric material, the second layer having on a surface thereof remote from the first layer, an adherent layer comprising an acrylic resin, as an upper sheet in a re-usable label.

The polymeric film is a self-supporting film, ie a self-supporting structure capable of independent existence in the absence of a supporting base.

The polymeric film first layer or substrate according to the invention may be formed from any synthetic, film-forming polymeric material. Suitable thermoplastics materials include a homopolymer or copolymer of a 1-olefine, such as ethylene, propylene and but-1-ene, a polyamide, a polycarbonate, and, particularly, a synthetic linear polyester which may be obtained by condensing one or more dicarboxylic acids or their lower alkyl (up to 6 carbon atoms) diesters, eg terephthalic acid, isophthalic acid, phthalic acid, 2,5- 2,6- or 2,7-naphthalenedicarboxylic acid, succinic acid, sebacic acid, adipic acid, azelaic acid, 4,4'-diphenyldicarboxylic acid, hexahydroterephthalic acid or 1,2-bis-p-carboxyphenoxyethane (optionally with a monocarboxylic acid, such as pivalic acid) with one or more glycols, particularly aliphatic glycols, eg ethylene glycol, 1,3-propanediol, 1,4-butanediol, neopentyl glycol and 1,4-cyclohexanedimethanol. A polyethylene terephthalate or polyethylene naphthalate film is preferred. A polyethylene terephthalate film is particularly preferred, especially such a film which has been biaxially oriented by sequential stretching in two mutually perpendicular directions, typically at a temperature in the range 70 to 125°, and preferably heat set, typically at a temperature in the range 150 to 250°, for example as described in British patent 838708.

The polymeric film first layer may also comprise a polyarylether or thio analogue thereof, particularly a polyaryletherketone, polyarylethersulphone, polyaryletheretherketone, polyaryletherethersulphone, or a copolymer or thioanalogue thereof. The first layer may comprise a poly(arylene sulphide), particularly poly-p-phenylene sulphide or copolymers thereof. Blends of the aforementioned polymers may also be employed.

Suitable thermoset resin materials include addition—polymerisation resins—such as acrylics, vinyls, bis-maleimides and unsaturated polyesters, formaldehyde condensate resins—such as condensates with urea, melamine or phenols, cyanate resins, functionalised polyesters, polyamides or polyimides.

The polymeric film according to the invention may be unoriented, or uniaxially oriented, but is preferably biaxially oriented by drawing in two mutually perpendicular directions in the plane of the film to achieve a satisfactory combination of mechanical and physical properties. Simultaneous biaxial orientation may be effected by extruding a thermoplastics polymeric tube which is subsequently quenched, reheated and then expanded by internal gas pressure to induce transverse orientation, and withdrawn at a rate which will induce longitudinal orientation. Sequential stretching may be effected in a stenter process by extruding the thermoplastics material as a flat extrudate which is subsequently stretched first in one direction and then in the other mutually perpendicular direction. Generally, it is preferred to stretch firstly in the longitudinal direction, ie the forward direction through the film stretching machine, and then in the transverse direction. A stretched film may be, and preferably is, dimensionally stabilised by heat-setting under dimensional restraint at a temperature above the glass transition temperature thereof.

The second layer of a polymeric film according to the invention comprises any one or more of the polymeric materials hereinbefore described as being suitable for use in forming the polymeric first layer. In a preferred embodiment of the invention the first layer and second layer comprise the same polymeric material, more preferably polyester, and particularly polyethylene terephthalate.

Formation of the second layer on the first layer may be effected by conventional techniques—for example, by casting the second layer polymer onto a preformed first layer. Preferably, however, formation is effected by coextrusion, either by simultaneous coextrusion of the respective film-forming layers through independent orifices of a multi-orifice die, and thereafter uniting the still molten layers, or, preferably, by single-channel coextrusion in which molten streams of the respective polymers are first united within a channel leading to a die manifold, and thereafter extruded together from the die orifice under conditions of streamline flow without intermixing thereby to produce a two layer film. A coextruded film is stretched to effect molecular orientation of the first layer, and preferably also of the second layer. In addition, the film is preferably heat-set.

Second layers may be disposed on one or both sides of the first layer. The polymeric film according to the invention may have a total thickness in the range from 10 to 500 $\mu$m, preferably from 15 to 200 $\mu$m, and especially from 30 to 80 $\mu$m. The second layer(s) preferably constitute from 1 to 50%, more preferably from 5 to 30%, and especially from 15 to 25% of the total thickness of the polymeric film. The second layer(s) preferably have a thickness of up to 20 $\mu$m, more preferably from 0.5 to 10 $\mu$m, and especially from 3 to 7 $\mu$m. In a preferred embodiment of the invention the polymeric film comprises a second layer/first layer/second layer structure, more preferably a symmetrical structure, and especially one having respective layer thicknesses of 5 $\mu$m/40 to 50 $\mu$m/5 $\mu$m.

The first layer is translucent, preferably exhibiting a wide angle haze in the range from 20% to 90%, more preferably from 30% to 80%, especially from 40% to 70%, and particularly from 50% to 65%, being measured according to the standard ASTM D 1003-61. The aforementioned wide angle haze ranges are particularly applicable to a first layer of approximately 50 $\mu$m thickness. The first layer is conveniently rendered translucent by incorporation into the synthetic polymer of an effective amount of an opacifying agent. Suitable opacifying agents include an incompatible resin filler, a particulate inorganic filler or a mixture of two or more such fillers.

By an "incompatible resin" is meant a resin which either does not melt, or which is substantially immiscible with the polymer, at the highest temperature encountered during extrusion and fabrication of the layer. The presence of an incompatible resin usually results in a voided first layer, by which is meant that the first layer comprises a cellular structure containing at least a proportion of discrete, closed cells. Suitable incompatible resins include polyamides and olefin polymers, particularly a homo- or co-polymer of a mono-alpha-olefin containing up to 6 carbon atoms in its molecule, for incorporation into a polyester first layer. For incorporation into a polyethylene terephthalate first layer, suitable materials include a low or high density olefin homopolymer, particularly polyethylene, polypropylene or poly-4-methylpentene-1, an olefin copolymer, particularly an ethylene-propylene copolymer, or a mixture of two or more thereof. Random, block or graft copolymers may be employed.

The amount of incompatible resin filler present in the first layer is preferably within the range from 0.5% to 30%, more preferably from 1% to 20%, especially from 1.5% to 12%, and particularly from 2% to 8% by weight, based on the weight of the first layer polymer.

Particulate inorganic fillers suitable for generating a translucent first layer include conventional white or opaque inorganic fillers and pigments, and particularly metal or metalloid oxides, such as titania, and alkaline metal salts, such as the carbonates and sulphates of calcium and barium. The particulate inorganic fillers may be of the voiding or non-voiding type. Suitable particulate inorganic fillers may be homogeneous and consist essentially of a single filler material or compound, such as titanium dioxide or barium sulphate alone. Alternatively, at least a proportion of the filler may be heterogeneous, the primary filler material being associated with an additional modifying component. For example, the primary filler particle may be treated with a surface modifier, such as a pigment, soap, surfactant coupling agent or other modifier to promote or alter the degree to which the filler is compatible with the first layer polymer.

In a particularly preferred embodiment of the invention, the particulate inorganic filler opacifying agent comprises titanium dioxide.

The individual or primary titanium dioxide particles suitably have a mean crystal size, as determined by electron microscopy, in the range from 0.05 to 0.4 $\mu$m, preferably from 0.1 to 0.2 $\mu$m, and more preferably of approximately 0.15 $\mu$m. In a preferred embodiment of the invention, the primary titanium dioxide particles aggregate to form clusters or agglomerates comprising a plurality of titanium dioxide particles. The aggregation process of the primary titanium dioxide particles may take place during the actual synthesis of the titanium dioxide and/or during the polymer and/or film making process.

The inorganic filler opacifying agent, suitably aggregated titanium dioxide, preferably has a volume distributed median particle diameter (equivalent spherical diameter corresponding to 50% of the volume of all the particles, read on the cumulative distribution curve relating volume % to the diameter of the particles—often referred to as the "D(v, 0.5)" value), as determined by laser diffraction, of from 0.3 to 1.5 $\mu$m, more preferably from 0.4 to 1.2 $\mu$m, and particularly from 0.5 to 0.9 $\mu$m.

The size distribution of the particles of the inorganic filler opacifying agent is also an important parameter, for example the presence of excessively large particles can result in the film exhibiting unsightly 'speckle', ie where the presence of filler aggregates in the film can be discerned with the naked eye. It is preferred that none of the particles of inorganic filler opacifying agent, preferably titanium dioxide, incorporated into the first layer should have an actual particle size exceeding 30 $\mu$m. Particles exceeding such a size may be removed by sieving processes which are known in the art. However, sieving operations are not always totally successful in eliminating all particles greater than a chosen size. In practice, therefore, the size of 99.9% by number of the filler particles should not exceed 30 $\mu$m, preferably should not exceed 20 $\mu$m, and more preferably should not exceed 15 $\mu$m. Preferably at least 90%, more preferably at least 95% of the filler particles are within the range of the volume distributed median particle diameter ±0.5 $\mu$m, and particularly ±0.3 $\mu$m.

The amount of inorganic filler opacifying agent, particularly of titanium dioxide, incorporated into the first layer polymer desirably should be less than 3% by weight, based on the weight of the polymer. Particularly satisfactory levels of translucence are achieved when the concentration of filler is from about 0.05% to 2%, especially from 0.1% to 0.5%, and particularly 0.2% to 0.4% by weight, based on the weight of the first layer polymer.

The preferred titanium dioxide particles may be of anatase or rutile crystal form. The titanium dioxide particles preferably comprise a major portion of anatase, more preferably at least 60% by weight, particularly at least 80%, and especially approximately 100% by weight of anatase. The particles can be prepared by standard procedures, such as using the chloride process or preferably by the sulphate process.

In one embodiment of the invention the titanium dioxide particles are coated preferably with inorganic oxides such as aluminium, silicon, zinc, magnesium or mixtures thereof. Preferably the coating additionally comprises an organic compound, such as fatty acids and preferably alkanols, suitably having from 8 to 30, preferably from 12 to 24 carbon atoms. Polydiorganosiloxanes or polyorganohydrogensiloxanes, such as polydimethylsiloxane or polymethylhydrogensiloxane are suitable organic compounds.

The coating is applied to the titanium dioxide particles in aqueous suspension. The inorganic oxides are precipitated in aqueous suspension from water-soluble compounds such as sodium aluminate, aluminium sulphate, aluminium hydroxide, aluminium nitrate, silicic acid or sodium silicate.

In one embodiment of the invention the first layer comprises an additional inorganic filler in combination with the aforementioned opacifying agent. The additional inorganic filler is preferably not a white pigment, and more preferably is of the non-voiding type. The primary function of the additional filler is to improve handleability of the film. A wide range of additional filler materials may be used such as silica, alumina, china clay, glass and/or silicone resin. The volume distributed median particle diameter, measured as herein described, of the additional filler is preferably in the range from 0.5 to 10 μm, more preferably from 2 to 8 μm, and especially from 5 to 7 μm. The amount of additional filler, particularly of silica, incorporated into the first layer polymer desirably should be less than 2% by weight, preferably from about 0.05% to 1%, especially from 0.1% to 0.5%, and particularly 0.2% to 0.4% by weight, based on the weight of the first layer polymer.

The components of the first layer compositions may be mixed together in conventional manner. For example, by mixing with the monomeric reactants from which the polymer is derived, or the components may be mixed with the polymer by tumble or dry blending or by compounding in an extruder, followed by cooling and, usually, comminution into granules or chips.

The second layer is transparent by which is meant substantially permeable to visible light. The second layer preferably exhibits a wide angle haze of <6%, more preferably in the range from 0.5% to 6%, and particularly from 1% to 3%, being measured according to the standard ASTM D 1003-61. The aforementioned wide angle haze ranges are particularly applicable to a second layer of approximately 5 μm thickness. The transparent second layer is preferably essentially unfilled, although relatively small amounts of filler may be present to improve handleability of the film. The second layer preferably comprises less than 0.3%, more preferably less than 0.25%, and particularly less than 0.2% by weight of filler material, based on the weight of the second layer polymer. Any filler present in the second layer is preferably not a white pigment, and more preferably is of the non-voiding type. A wide range of filler materials may be used such as silica, alumina, china clay, glass and/or silicone resin. China clay is a preferred inorganic filler for use in the second layer, such as a polyester, preferably a polyethylene terephthalate film. The second layer filler, suitably of china clay, preferably has a volume distributed median particle diameter, measured as herein described, in the range from 0.1 to 10 μm, more preferably from 0.2 to 3 μm, and especially from 0.3 to 0.6 μm.

Particle size of all the filler particles described herein may be measured by electron microscope, coulter counter, sedimentation analysis and static or dynamic light scattering. Techniques based on laser light diffraction are preferred. The median particle size may be determined by plotting a cumulative distribution curve representing the percentage of particle volume below chosen particle sizes and measuring the 50th percentile. The volume distributed median particle diameter of the filler particles is suitably measured using a Malvern Instruments Mastersizer MS 15 Particle Sizer after dispersing the filler in ethylene glycol in a high shear (eg Chemcoll) mixer.

The adherent layer of a polymeric film according to the invention comprises an "acrylic resin" by which is meant a resin which comprises at least one acrylic and/or methacrylic component.

The acrylic resin is preferably thermoset and preferably comprises at least one monomer derived from an ester of acrylic acid and/or an ester of methacrylic acid, and/or derivatives thereof. In a preferred embodiment of the invention, the acrylic resin comprises greater than 50 mole %, preferably less than 98 mole %, more preferably from 60 to 97 mole %, especially from 70 to 96 mole %, and particularly from 80 to 94 mole % of at least one monomer derived from an ester of acrylic acid and/or an ester of methacrylic acid, and/or derivatives thereof. A preferred acrylic resin for use in the present invention preferably comprises an alkyl ester of acrylic and/or methacrylic acid where the alkyl group contains up to ten carbon atoms such as methyl, ethyl, n-propyl, isopropyl, n-butyl, isobutyl, terbutyl, hexyl, 2-ethylhexyl, heptyl, and n-octyl. Polymers derived from an alkyl acrylate, for example ethyl acrylate and butyl acrylate, together with an alkyl methacrylate are preferred. Polymers comprising ethyl acrylate and methyl methacrylate are particularly preferred. The acrylate monomer is preferably present in a proportion in the range 30 to 65 mole %, and the methacrylate monomer is preferably present in a proportion in the range of 20 to 60 mole %.

Other monomers which are suitable for use in the preparation of the acrylic resin of the adherent layer, which may be preferably copolymerised as optional additional monomers together with esters of acrylic acid and/or methacrylic acid, and/or derivatives thereof, include acrylonitrile, methacrylonitrile, halo-substituted acrylonitrile, halo-substituted methacrylonitrile, acrylamide, methacrylamide, N-methylol acrylamide, N-ethanol acrylamide, N-propanol acrylamide, N-methacrylamide, N-ethanol methacrylamide, N-methyl acrylamide, N-tertiary butyl acrylamide, hydroxy-ethyl methacrylate, glycidyl acrylate, glycidyl methacrylate, dimethylamino ethyl methacrylate, itaconic acid, itaconic anhydride and half esters of itaconic acid.

Other optional monomers of the acrylic resin adherent layer polymer include vinyl esters such as vinyl acetate, vinyl chloroacetate and vinyl benzoate, vinyl pyridine, vinyl chloride, vinylidene chloride, maleic acid, maleic anhydride, styrene and derivatives of styrene such as chloro styrene, hydroxy styrene and alkylated styrenes, wherein the alkyl group contains from one to ten carbon atoms.

A preferred acrylic resin, derived from 3 monomers comprises 35 to 60 mole % of ethyl acrylate/30 to 55 mole % of methyl methacrylate/2–20 mole % of acrylamide or methacrylamide, and especially comprising approximate molar proportions 46/46/8% respectively of ethyl acrylate/methyl methacrylate/acrylamide or methacrylamide, the latter polymer being particularly effective when thermoset—for example, in the presence of about 25 weight % of a methylated melamine-formaldehyde resin.

A preferred acrylic resin, derived from 4 monomers comprises a copolymer comprising comonomers (a) 35 to 40 mole % alkyl acrylate, (b) 35 to 40 mole % alkyl methacrylate, (c) 10 to 15 mole % of a monomer containing a free carboxyl group, and (d) 15 to 20 mole % of a monomer containing sulphonic acid and/or a salt thereof. Ethyl acrylate is a particularly preferred monomer (a) and methyl methacrylate is a particularly preferred monomer (b). Monomer (c) containing a free carboxyl group, ie a carboxyl group other than those involved in the polymerisation reaction by which the copolymer is formed, suitably comprises a copolymerisable unsaturated carboxylic acid, and is preferably selected from acrylic acid, methacrylic acid, maleic acid, and/or itaconic acid; with acrylic acid and itaconic acid being particularly preferred. The sulphonic acid monomer (d) is preferably aromatic and may be present as the free acid and/or a salt thereof, for example as the ammonium, substituted ammonium, or an alkali metal, such as lithium, sodium or potassium, salt. The sulphonate group does not participate in the polymerisation reaction by which the adherent copolymer resin is formed. The sulphonic acid monomer is preferably p-styrene sulphonic acid and/or a salt thereof.

The weight average molecular weight of the acrylic resin can vary over a wide range but is preferably within the range 10,000 to 10,000,000, and more preferably within the range 50,000 to 200,000.

The acrylic resin preferably comprises at least 30% by weight of the layer and, more preferably, between 45% and 99%, particularly between 55% and 90%, and especially between 65% and 85% by weight of the coating layer. The acrylic resin is generally water-insoluble. The adherent layer coating composition including the water-insoluble acrylic resin may nevertheless be applied to the surface of the polymeric second layer as an aqueous dispersion.

In one embodiment of the invention the adherent layer coating composition additionally comprises a phthalate ester preferably having the general structure

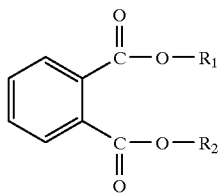

wherein $R_1$ and $R_2$, which may be the same or different, preferably represent an alkyl group, optionally substituted, a cyclohexyl group, a benzyl group and/or a phenyl group. When $R_1$ and/or $R_2$ represent an alkyl group, the alkyl group preferably contains up to 20, more preferably up to 10, particularly from 3 to 9, and especially from 6 to 8 carbon atoms. The alkyl group may be a straight chain or preferably branched, preferably containing one branch. $R_1$ and/or $R_2$ may comprise more than one alkyl group linked by one or more ether groups, for example ethoxyethyl or butoxyethyl groups. $R_1$ is preferably an alkyl group, more preferably containing up to 10 carbon atoms, and $R_2$ is preferably a benzyl group or a phenyl group, more preferably a benzyl group.

Suitable phthalate esters include dimethyl phthalate, diethyl phthalate, dibutyl phthalate, diisohexyl phthalate, butyl 2-ethylhexyl phthalate, di-2-ethylhexyl phthalate, diisooctyl phthalate, dicapryl phthalate, heptyl nonyl phthalate, diisononyl phthalate, butyl isodecyl phthalate, n-octyl n-decyl phthalate, diisodecyl phthalate, heptyl nonyl undecyl phthalate, diundecyl phthalate, ditridecyl phthalate, diallyl phthalate, butyl cyclohexyl phthalate, dicyclohexyl phthalate, diphenyl phthalate, butyl benzyl phthalate, cyclohexyl benzyl phthalate, 7-(2,6,6,8-tetramethyl-4-oxa-3-oxononyl) benzyl phthalate, methoxyethoxyethyl benzyl phthalate, dimethoxyethyl phthalate, diethoxyethoxyethyl phthalate and dibutoxyethyl phthalate. A particularly preferred phthalate ester is benzyl 2-ethylhexyl phthalate.

In order to optimise the compatibility of the phthalate ester with the acrylic resin it is preferred that the phthalate ester has a dielectric constant in the range from 3.0 to 8.0, more preferably from 4.5 to 7.5, and particularly from 5.0 to 6.5.

The molecular weight of the phthalate ester is preferably less than 5000, more preferably less than 1000, particularly in the range from 200 to 600, and especially from 300 to 400.

The phthalate ester should preferably be present in the adherent layer in the range from 0.05% to 20%, more preferably from 0.1% to 10%, particularly from 0.5% to 5%, and especially from 0.8% to 2.0% by weight relative to the total weight of the adherent layer. Two or more different phthalate esters may be present in the adherent layer.

If desired, the adherent layer coating composition may also contain a cross-linking agent which functions to cross-link the layer thereby improving adhesion to the second layer. Additionally, the cross-linking agent should preferably be capable of internal cross-linking in order to provide protection against solvent penetration. Suitable cross-linking agents may comprise epoxy resins, alkyd resins, amine derivatives such as hexamethoxymethyl melamine, and/or condensation products of an amine, eg melamine, diazine, urea, cyclic ethylene urea, cyclic propylene urea, thiourea, cyclic ethylene thiourea, alkyl melamines, aryl melamines, benzo guanamines, guanamines, alkyl guanamines and aryl guanamines, with an aldehyde, eg formaldehyde. A useful condensation product is that of melamine with formaldehyde. The condensation product may optionally be alkoxylated. The cross-linking agent may suitably be used in amounts of up to 60%, preferably up to 50%, more preferably in the range from 10% to 45%, and especially from 15% to 35% by weight relative to the total weight of the adherent layer. A catalyst is also preferably employed to facilitate cross-linking action of the cross-linking agent. Preferred catalysts for cross-linking melamine formaldehyde include para toluene sulphonic acid, maleic acid stabilised by reaction with a base, morpholinium paratoluene sulphonate, and ammonium nitrate.

The adherent layer coating composition may be applied before, during or after the stretching operation in the production of an oriented polymeric film. The adherent layer coating composition is preferably applied to the second layer between the two stages (longitudinal and transverse) of a thermoplastics film biaxial stretching operation. Such a sequence of stretching and coating is suitable for the production of an adherent layer coated linear polyester film, particularly a film comprising a polyethylene terephthalate first layer and one or two polyethylene terephthalate second layers, which film is preferably firstly stretched in the longitudinal direction over a series of rotating rollers, coated, and then stretched transversely in a stenter oven, preferably followed by heat setting.

An adherent layer coated polyester film, especially having a polyethylene terephthalate first and/or second layer(s) is suitably heated from 150° C. to 240° C., preferably from 200° C. to 220° C., in order to dry the aqueous medium, or the solvent in the case of solvent-applied compositions, and also to assist in coalescing and forming the coating into a continuous and uniform layer. The cross-linking of cross-linkable coating compositions is also achieved at such temperatures.

The adherent layer coating composition is preferably applied to the second layer by any suitable conventional technique such as dip coating, bead coating, reverse roller coating or slot coating.

The adherent layer is preferably applied to the second layer at a dry coat weight within the range 0.05 to 10 mgdm$^{-2}$, especially 0.1 to 2.0 mgdm$^{-2}$. For films having a second layer on both sides of the first layer, with an adherent layer on both of the second layers, each adherent layer preferably has a coat weight within the preferred range.

Prior to deposition of the adherent layer onto the second layer, the exposed surface thereof may, if desired, be subjected to a chemical or physical surface-modifying treatment to improve the bond between that surface and the subsequently applied adherent layer. A preferred treatment, because of its simplicity and effectiveness, is to subject the exposed surface of the second layer to a high voltage electrical stress accompanied by corona discharge. Alternatively, the second layer surface may be pretreated with an agent known in the art to have a solvent or swelling action on the second layer polymer. Suitable materials for a polyester second layer include a halogenated phenol dissolved in a common organic solvent, eg a solution of p-chloro-m-cresol, 2,4-dichlorophenol, 2,4,5- or 2,4 6-trichlorophenol or 4-chlororesorcinol in acetone or methanol.

The external surface of the adherent layer coated second layer of a polymeric film according to the invention preferably exhibits a root mean square surface roughness (Rq), measured using a RSt 'Rough Surface Tester' WYKO Corporation, in the range from 5 to 220 nm, more preferably 50 to 200 nm, especially 100 to 180 nm, and particularly 140 to 160 nm.

One or more of the layers of a polymeric film according to the invention, ie first, second and/or adherent layer(s), may conveniently contain any of the additives conventionally employed in the manufacture of polymeric films. Thus, additional agents such as dyes, pigments, voiding agents, lubricants, anti-oxidants, anti-blocking agents, surface active agents, slip aids, gloss-improvers, prodegradants, ultra-violet light stabilisers, viscosity modifiers and dispersion stabilisers may be incorporated in the first, second and/or adherent layer(s), as appropriate.

Adherent layer coated polymeric films of the present invention can be used to form various types of composite structures by coating or laminating additional materials onto the adherent layer coated film. A suitable method of forming a re-usable label is described in WO-92/22434.

BRIEF DESCRIPTION OF DRAWINGS

The invention is illustrated by reference to the accompanying drawings in which.

Referring to FIG. 1 of the drawings, the film comprises a first layer (1) having a second layer (2) bonded to one surface (3) thereof, and an adherent layer (4) bonded to a surface (5) of the second layer remote from the first layer (1).

Figure 1:
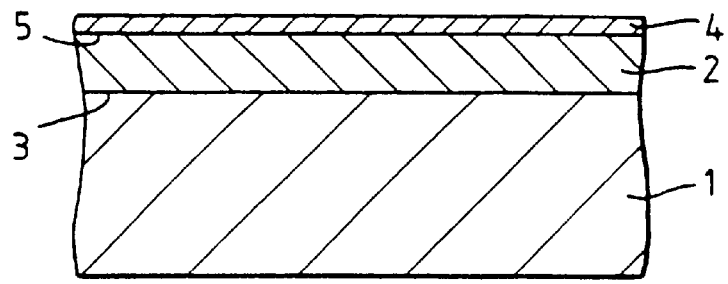
FIG. 1 is a schematic sectional elevation, not to scale, of a polymeric film having an adherent layer adhered directly to a second layer, which is adhered directly to a first surface of a first layer.
Figure 2:
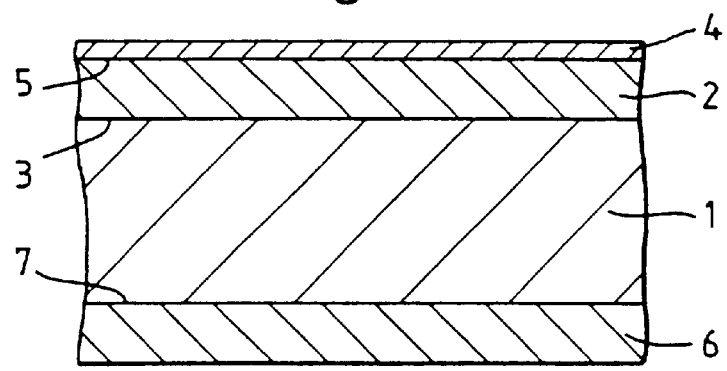
FIG. 2 is a similar schematic elevation of a polymeric film with an additional second layer adhered directly to a second surface of the first layer.

The film of FIG. 2 further comprises an additional second layer (6), bonded to a second surface (7) of the first layer (1).

Figure 3:
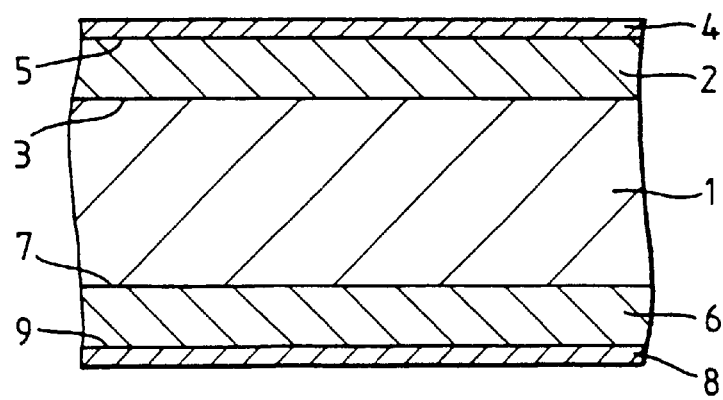
FIG. 3 is a similar schematic elevation of a polymeric film with an additional adherent layer adhered directly to the additional second layer.

The film of FIG. 3 further comprises an additional adherent layer (8), bonded to a surface (9) of the additional second layer (6) remote from the first layer (1).

The invention is further illustrated by reference to the following Examples.

EXAMPLE 1

A polymeric film comprising (i) a first layer of polyethylene terephthalate containing 0.3% by weight of the polymer of titanium dioxide having a volume distributed median particle diameter of 0.7 μm and 0.3% by weight of the polymer of silica having a volume distributed median particle diameter of 6 μm, and (ii) two second layers of polyethylene terephthalate containing 0.15% by weight of the polymer of china clay having a volume distributed median particle diameter of 0.4 μm, were produced by a process of single channel coextrusion. The volume distributed median particle diameter of the filler particles was measured using a Malvern Instruments Mastersizer MS 15 Particle Sizer after dispersing the filler in ethylene glycol in a high shear (eg Chemcoll) mixer. Streams of the first layer and second layer polyethylene terephthalate were supplied by separate extruders, united in a tube leading to the manifold of an extrusion die and extruded simultaneously through the die under conditions of streamline flow and without intermixing. The polymeric film composite emerging from the extrusion die was quenched immediately upon a water-cooled rotating metal drum having a polished surface and stretched to 3.3 times its original dimension in the direction of extrusion at a temperature of about 85° C. The monoaxially oriented film was coated on both sides with an adherent layer coating composition comprising the following ingredients:

| | | |
|---|---|---|
| Acrylic resin | 163 | ml |
| (46% w/w aqueous latex of methyl methacrylate/ethyl acrylate/methacrylamide: 46/46/8 mole %, with 25% by weight methoxylated melamine-formaldehyde) | | |
| Ammonium nitrate | 6 | ml |
| (10% w/w aqueous solution) | | |
| SYNPERONIC ® NDB | 7 | ml |
| (13.7% w/w aqueous solution of a nonyl phenol ethoxylate, supplied by ICI) | | |
| Demineralised water | to 2.5 | liters |

The coated film was passed into a stenter oven, where the film was stretched in the sideways direction to approximately 3.5 times its original dimensions. The coated biaxially stretched polymeric film was heat set at a temperature of about 220° C. by conventional means. The resulting film composite consisted of a biaxially oriented and heat-set translucent polyethylene terephthalate first layer substrate and two transparent polyethylene terephthalate second layers. Final film thickness was 50 μm, each second layer being about 5 μm thick. The dry coat weight of the adherent layers was approximately 0.4 mgdm$^{-2}$ and the thickness of the coating layers was approximately 0.4 μm.

The wide angle haze, measured according to the standard ASTM D 1003-61, of the polymeric film was 60%.

The root mean square surface roughness (Rq) of the external surface of the adherent layer coated second layer of the polymeric film was 152 nm—measured using a RSt 'Rough Surface Tester' WYKO Corporation (using vertical scanning interferometry, ×10 objective (611×642 μm field of view), 0.25 mm digital high pass filter, lateral resolution detector at the highest setting, vertical resolution at the highest setting (ie scan speed at the lowest speed), modulation threshold=2%, and an average of 5 measurements per data set taken).

The adherent layer surface of the polymeric film was written on with a HB pencil, and the writing rubbed out using a finger. The procedure was repeated 10 times. There was no indication of permanent marking on the resultant film surface.

The polymeric film was placed on top of a sheet of paper having a 10 μm thick upper wax layer. A line was drawn using a pointed instrument on the surface of the adherent layer of the polymeric film/wax layer/paper sandwich. The line had excellent definition and was easily erased by separating the polymeric film from the wax coated paper sheet.

The strength of adhesion of a subsequently applied organic solvent based cellulose acetate butyrate (CAB) lacquer to the adherent layer coated polymeric film was measured using a standard cross-hatch adhesion test. The lacquer was coated using a Meyer bar, and cured in an oven at 120° C. for one minute prior to testing. Cellulose acetate butyrate (CAB) lacquer containing the following ingredients by weight was used:

| | |
|---|---|
| Eastman Kodak 3 Seconds 272/3 resin (CAB) | 15.0 parts |
| Methyl isobutyl ketone (MIBK) | 42.5 parts |
| Methyl ethyl ketone (MEK) | 42.5 parts |
| Rhodamine dye | 0.06 parts |

The results were determined as the number of squares remaining (a maximum of 100) after one pull of adhesive tape. If 98 or more squares out of a 100 remain after the adhesive tape has been pulled off the film, the adhesion is acceptable and the film is designated a "pass". If less than 98 squares remain, the adhesion is unacceptable and the film is designated a "fail".

The CAB lacquer adhesion test performed on the adherent layer coated polymeric film of this example was designated a "pass".

EXAMPLE 2

This is a comparative example not according to the example. The procedure of Example 1 was repeated except that the polymeric film consisted of a single layer of polyethylene terephthalate containing 0.3% by weight of the polymer of titanium dioxide having a volume distributed median particle diameter of 0.7 μm and 0.3% by weight of the polymer of silica having a volume distributed median particle diameter of 6 μm. The film was coated on both sides with the adherent layer coating composition used in Example 1. Final film thickness was 50 μm. The dry coat weight of the adherent layers was approximately 0.4 mgdm$^{-2}$ and the thickness of the coating layers was approximately 0.4 μm.

The root mean square surface roughness (Rq) of the external surface of the adherent layer coated polymeric film was 256 nm.

The adherent layer surface of the polymeric film was written on with a HB pencil, and the writing rubbed out using a finger. The procedure was repeated 10 times. There was significant permanent marking on the resultant film surface which detracted from the aesthetic appearance of the film.

EXAMPLE 3

This is a comparative example not according to the example. The procedure of Example 1 was repeated except that adherent layer coating stage was omitted.

The uncoated polymeric film was placed on top of a sheet of paper having a 10 μm thick upper wax layer. A line was drawn using a pointed instrument on the top surface of the polymeric film/wax layer/paper sandwich. The definition of the line was not as good as produced using the film of Example 1.

The CAB lacquer adhesion test was performed on the uncoated polymeric film and designated a "fail".

The above results illustrate the improved properties of polymeric films according to the present invention.

We claim:

1. A polymeric film comprising a translucent first layer of polyester material, the first layer having on at least one surface thereof a transparent second layer of polyester material, the second layer having on a surface thereof remote from the first layer, an adherent layer comprising an acrylic resin, the first layer comprising 0.05% to 2% of an inorganic filler opacifying agent, based upon the weight of the polyester material of the first layer, said adherent layer having a dry coat weight within the range of from 0.05 mgdm$^{-2}$ wherein the first layer and second layer comprise the same polyester which is selected from polyethylene terephthalate and polyethylene naphthalate;

wherein the first layer has a wide angle haze in the range from 30% to 80%;

wherein the second layer has a wide angle haze in the range of 0.5% to 6%; and wherein the acrylic resin comprises from 70 to 96 mole % derived from at least one monomer of an ester of acrylic acid, ester of methacrylic acid and/or derivatives thereof.

2. A film according to claim 1 wherein the opacifying agent comprises titanium dioxide.

3. A film according to claim 1 wherein the film comprises both a first layer and at least one second layer of biaxially oriented polyethylene terephthalate.

* * * * *